United States Patent
Lin et al.

(10) Patent No.: US 10,555,221 B2
(45) Date of Patent: Feb. 4, 2020

(54) CELL DISCOVERY METHOD, DEVICE, AND SYSTEM

(71) Applicant: Huawei Technologies Co., Ltd., Shenzhen, Guangdong (CN)

(72) Inventors: Bo Lin, Beijing (CN); Li Chai, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 602 days.

(21) Appl. No.: 14/243,598

(22) Filed: Apr. 2, 2014

(65) Prior Publication Data
US 2014/0235246 A1    Aug. 21, 2014

Related U.S. Application Data

(63) Continuation of application No. PCT/CN2012/082564, filed on Oct. 8, 2012.

(30) Foreign Application Priority Data

Oct. 2, 2011   (CN) .......................... 2011 1 0294098

(51) Int. Cl.
    *H04W 36/00*    (2009.01)
(52) U.S. Cl.
    CPC ......... *H04W 36/0016* (2013.01); *Y02D 70/00* (2018.01)
(58) Field of Classification Search
    CPC ... H04W 36/08; H04W 88/08; H04W 84/045; H04W 88/18; H04W 24/10; H04W 28/18;
    (Continued)

(56) References Cited

U.S. PATENT DOCUMENTS 6,195,552 B1 * 2/2001 Jeong .................... H04B 7/022
                                                    370/331
8,554,210 B2 * 10/2013 Choi ................... H01L 23/5228
                                                    455/434
(Continued)

FOREIGN PATENT DOCUMENTS

CN    101242327 A    8/2008
CN    101690339 A    3/2010
(Continued)

OTHER PUBLICATIONS

Tao et al, Method for Identifying interfered mobile terminals and methods for avoiding interference, CN102143501A, Published Aug. 3, 2011, Google Patents Translation dated Dec. 14, 2016.*
(Continued)

*Primary Examiner* — Matthew C Sams
(74) *Attorney, Agent, or Firm* — Womble Bond Dickinson (US) LLP

(57) ABSTRACT

A cell discovery method, device, and system are disclosed, which relate to the radio communications field, so as to purposefully perform small-scale search and measurement, thereby improving the search efficiency and saving power. The method includes: after receiving first radio frequency information of a handover area and second radio frequency information reported by a user equipment served by a cell of a first base station, detecting, by the first base station, whether the second radio frequency information matches the first radio frequency information; if match, sending a measurement instruction message to the user equipment that reports the second radio frequency information, so as to instruct the user equipment to measure signal strength and/or signal quality of a cell at a frequency of a cell of a second base station or only of the cell of the second base station. Solutions disclosed are used for cell search and discovery.

6 Claims, 11 Drawing Sheets

(58) Field of Classification Search
CPC ..... H04W 36/18; H04W 36/30; H04W 36/36; H04W 48/20; H04W 72/0453; H04W 84/12; H04W 88/02; H04W 8/26; H04J 11/0069

See application file for complete search history.

(56) References Cited

U.S. PATENT DOCUMENTS

| | | | | |
|---|---|---|---|---|
| 8,577,373 | B2* | 11/2013 | Matsuo | H04W 36/0072 455/435.1 |
| 8,644,830 | B2* | 2/2014 | Mori | H04J 11/0069 455/436 |
| 8,676,205 | B2* | 3/2014 | Kwun | H04W 24/10 370/329 |
| 2005/0101328 | A1* | 5/2005 | Son | H04W 36/26 455/436 |
| 2005/0197124 | A1* | 9/2005 | Kang | H04W 36/30 455/439 |
| 2006/0003767 | A1* | 1/2006 | Kim | H04W 36/18 455/436 |
| 2007/0037584 | A1* | 2/2007 | Um | H04W 36/18 455/456.1 |
| 2007/0217383 | A1* | 9/2007 | Mitani | H04W 36/36 370/338 |
| 2008/0032696 | A1* | 2/2008 | Choi | H01L 23/5228 455/442 |
| 2008/0076430 | A1 | 3/2008 | Olson | |
| 2008/0207207 | A1* | 8/2008 | Moe | H04J 11/0093 455/439 |
| 2009/0131052 | A1 | 5/2009 | Hakola et al. | |
| 2009/0247163 | A1* | 10/2009 | Aoyama | H04W 48/10 455/436 |
| 2010/0151864 | A1 | 6/2010 | Mori | |
| 2011/0111754 | A1 | 5/2011 | Sharaga et al. | |
| 2011/0205122 | A1 | 8/2011 | Siomina et al. | |
| 2011/0300868 | A1* | 12/2011 | Matsuo | H04W 36/0072 455/436 |
| 2012/0289274 | A1 | 11/2012 | Matsuo et al. | |
| 2012/0302254 | A1* | 11/2012 | Charbit | H04W 4/005 455/456.1 |
| 2013/0182583 | A1* | 7/2013 | Siomina | H04W 24/10 370/252 |

FOREIGN PATENT DOCUMENTS

| | | | | |
|---|---|---|---|---|
| CN | 101911797 A | | 12/2010 | |
| CN | 102143501 A | * | 8/2011 | |
| EP | 2 150 072 A1 | | 2/2010 | |
| EP | 2 523 501 A1 | | 11/2012 | |
| JP | 2005318405 A | | 11/2005 | |
| JP | 2010141801 A | | 6/2010 | |
| JP | WO 2010113407 A1 | * | 10/2010 | ........ H04W 36/0072 |
| JP | 2011518471 A | | 6/2011 | |
| JP | 2011155635 A | | 8/2011 | |
| JP | 2012531112 A | | 12/2012 | |
| WO | WO 2009/117658 A1 | | 9/2009 | |
| WO | WO 2010/148290 A1 | | 12/2010 | |
| WO | WO 2011/043044 A1 | | 4/2011 | |
| WO | WO 2011/083837 A1 | | 7/2011 | |
| WO | WO 2011/086927 A1 | | 7/2011 | |

OTHER PUBLICATIONS

Machine Translation of WO 2010113407A1.*
"Network-initiated inbound mobility for HeNBs", Kyocera Corporation, 3GPP TSG-RAN WG2 #67bis, Oct. 12-16, 2009, 2 pages.
"On Network-Assisted Pico Cell Discovery in LTE HetNets", Alcatel-Lucent, 3 pages, R2-114362.

* cited by examiner

CELL DISCOVERY METHOD, DEVICE, AND SYSTEM

CROSS-REFERENCE TO RELATED APPLICATIONS

This application is a continuation of International Application No. PCT/CN2012/082564, filed on Oct. 8, 2012, which claims priority to Chinese Patent Application No. 201110294098.2, filed on Oct. 2, 2011, both of which are incorporated herein by reference in their entireties.

TECHNICAL FIELD

The present invention relates to a radio communications system, and in particular, to a cell discovery method, device, and system.

BACKGROUND

Currently, connections between different types of networks are mostly connections between heterogeneous networks. Different types of base stations are deployed in a heterogeneous network. To improve throughput of a radio communications system and reduce load of a cell serving a user equipment, the user equipment needs to discover, by means of search and measurement, an appropriate neighboring cell to perform cell handover.

In a cell discovery method in the prior art, the user equipment starts, according to an instruction from a serving base station, large-scale search and measurement blindly on cells of other base stations; then discovers an appropriate neighboring cell; and after performing signal measurement on the discovered neighboring cell, determines whether to perform cell handover.

In a process of implementing the cell discovery, the user equipment needs to blindly perform large-scale search, and this is very power-consuming.

SUMMARY

Embodiments of the present invention provide a cell discovery method, device, and system, so as to purposefully perform small-scale search and measurement, thereby improving the search efficiency and saving power.

To achieve the foregoing objectives, the embodiments of the present invention use the following technical solutions:

A cell discovery method includes:

receiving, by a first base station, first radio frequency information of a handover area;

receiving, by the first base station, second radio frequency information that is reported by a user equipment served by a cell of the first base station;

detecting whether the second radio frequency information reported by the user equipment matches the first radio frequency information of the handover area; and if the second radio frequency information reported by the user equipment matches the first radio frequency information of the handover area, sending a measurement instruction message to the user equipment that reports the second radio frequency information for instructing the user equipment to measure signal strength and/or signal quality of a cell at a frequency of a cell of a second base station or only of the cell of the second base station.

A cell discovery method includes:

receiving, by a second base station, first radio frequency information of a handover area, where the first radio frequency information is reported by a user equipment in a cell of the second base station; and sending, by the second base station, the first radio frequency information of the handover area to a first base station, so that the first base station instructs, according to the first radio frequency information of the handover area, the user equipment to measure signal strength and/or signal quality of a cell at a frequency of the cell of the second base station or only of the cell of the second base station.

A cell discovery method includes:

detecting, by a second base station, proximity of a user equipment; and notifying, by the second base station, a first base station of proximity information, so that the first base station instructs a user equipment to measure signal strength and/or signal quality of a cell at a frequency of a cell of the second base station or only of the cell of the second base station.

A cell discovery method includes:

receiving, by a first base station, first radio frequency information of a handover area; and broadcasting, by the first base station in a system message, the first radio frequency information of the handover area, so that when second radio frequency information acquired by a user equipment matches the first radio frequency information of the handover area, the user equipment measures signal strength and/or signal quality of a cell at a frequency of a cell of a second base station or only of the cell of the second base station.

A cell discovery method includes:

receiving, by a user equipment, first radio frequency information of a handover area, where the first radio frequency information is broadcast by a first base station;

detecting whether the first radio frequency information of the handover area matches second radio frequency information acquired by the user equipment; and if they match, measuring signal strength and/or signal quality of a cell at a frequency of a cell of a second base station or only of the cell of the second base station.

A first base station includes:

a first information receiving unit, configured to receive first radio frequency information of a handover area;

a second information receiving unit, configured to receive second radio frequency information that is reported by a user equipment served by a cell of the first base station;

a detecting unit, configured to detect whether the second radio frequency information reported by the user equipment matches the first radio frequency information of the handover area; and a first information sending unit, configured to send, when the detecting unit detects that they match, a measurement instruction message to the user equipment that reports the second radio frequency information, so as to instruct the user equipment to measure signal strength and/or signal quality of a cell at a frequency of a cell of a second base station or only of the cell of the second base station.

A second base station includes:

a third information receiving unit, configured to receive first radio frequency information of a handover area, where the first radio frequency information is reported by a user equipment in a cell of the second base station; and a second information sending unit, configured to send the first radio frequency information of the handover area to a first base station, so that the first base station instructs, according to the first radio frequency information of the handover area, the user equipment to measure signal strength and/or signal quality of a cell at a frequency of the cell of the second base station or only of the cell of the second base station.

A second base station includes:

a detecting unit, configured to detect proximity of a user equipment; and an information notification unit, configured to notify a first base station of proximity information, so that the first base station instructs the user equipment to measure signal strength and/or signal quality of a cell at a frequency of a cell of the second base station or only of the cell of the second base station.

A first base station includes:

a fifth information receiving unit, configured to receive first radio frequency information of a handover area; and an information broadcast unit, configured to broadcast, in a system message, the first radio frequency information of the handover area, so that when second radio frequency information acquired by a user equipment matches the first radio frequency information of the handover area, the user equipment measures signal strength and/or signal quality of a cell at a frequency of a cell of a second base station or only of the cell of the second base station.

A user equipment includes:

a user receiving unit, configured to receive first radio frequency information of a handover area, where the first radio frequency information is broadcast by a first base station;

a user detecting unit, configured to detect whether the first radio frequency information of the handover area matches second radio frequency information acquired by the user equipment; and a user measuring unit, configured to, when the user detecting unit detects that they match, measure signal strength and/or signal quality of a cell at a frequency of a cell of a second base station or only of the cell of the second base station.

A cell discovery system includes:

the first base station and the second base station that are described above; and/or the second base station described above; and/or the first base station and the user equipment that are described above.

Embodiments of the present invention provide a cell discovery method, device, and system. After first radio frequency information of a handover area is received and second radio frequency information that is reported by a user equipment served by a cell of a first base station is received, it is detected whether the second radio frequency information reported by the user equipment matches the first radio frequency information of the handover area; and if they match, a measurement instruction message is sent to the user equipment that reports the second radio frequency information, so as to instruct the user equipment to measure signal strength and/or signal quality of a cell at a frequency of a cell of a second base station or only of the cell of the second base station. In this way, small-scale search and measurement can be purposefully performed, thereby improving the search efficiency and achieving a power saving effect. In addition, the second base station detects proximity of the user equipment and notifies the first base station of proximity information, so that the first base station instructs the user equipment to measure the signal strength and/or signal quality of the cell at the frequency of the cell of the second base station or only of the cell of the second base station. In this way, small-scale search and measurement can also be purposefully performed, thereby improving the search efficiency and achieving the power saving effect. Moreover, after receiving the first radio frequency information of the handover area that is located between the first base station and the second base station, the first base station broadcasts, in a system message, the first radio frequency information of the handover area, so that when the second radio frequency acquired by the user equipment matches the first radio frequency information of the handover area, the user equipment measures the signal strength and/or signal quality of the cell at the frequency of the cell of the second base station or only of the cell of the second base station. In this way, small-scale search and measurement can be purposefully performed, thereby improving the search efficiency and achieving the power saving effect.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

A handover area described in Embodiments 1 to 5 of the present invention refers to an area where a user equipment hands over from a second base station to a first base station. First radio frequency information of the handover area carries frequency information of a cell of the second base station and/or an identifier of the cell of the second base station, where the second base station corresponds to the handover area.

In Embodiments 1 to 5 of the present invention, a user equipment that measures the second radio frequency information may be the same as or different from a user equipment that finally measures signal strength and/or signal quality. No limitations are set herein.

Embodiment 1

Figure 1:
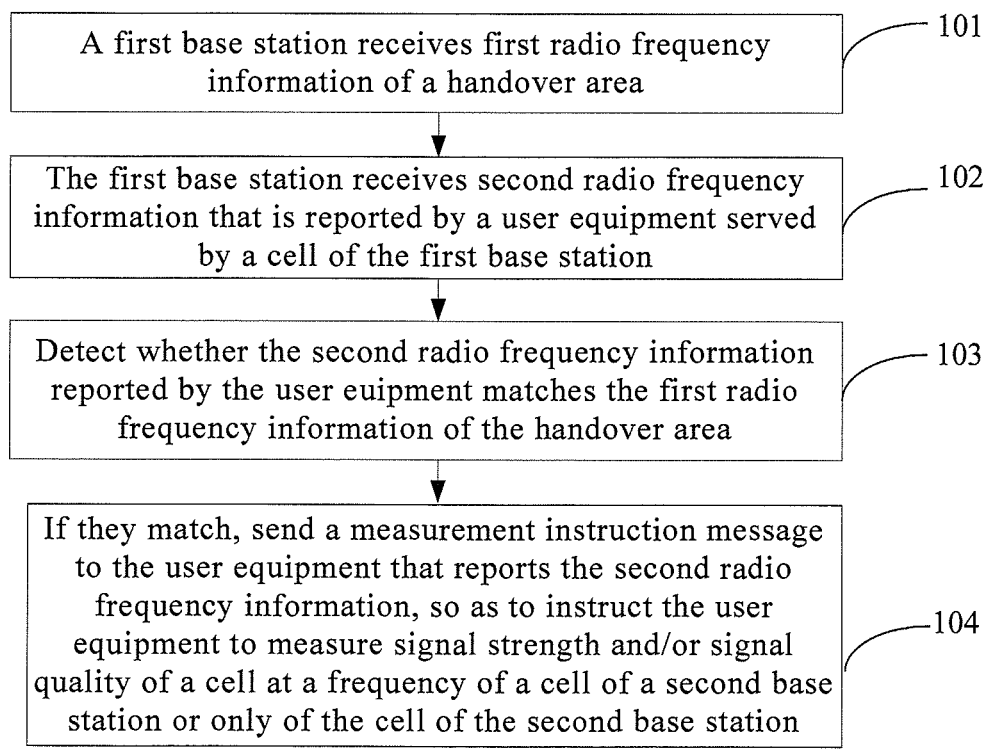
FIG. 1 is a flowchart of a cell discovery method according to Embodiment 1.

This embodiment of the present invention provides a cell discovery method. The method is used on a side of a first base station. As shown in FIG. 1, the method includes the following steps:

101. The first base station receives first radio frequency information of a handover area.

The first radio frequency information is radio frequency information of the handover area. The first radio frequency information is obtained, by means of measurement, by a user equipment that is located in the handover area. The first radio frequency information may map to geographical information of the handover area.

102. The first base station receives second radio frequency information that is reported by a user equipment served by a cell of the first base station.

The user equipment served by the cell of the first base station may periodically report, at a preset time interval, the second radio frequency information to the first base station serving the user equipment. The second radio frequency information is measured by the user equipment at a location of the user equipment, and therefore, the second radio frequency information may map to geographical information of the location of the user equipment.

103. Detect whether the second radio frequency information reported by the user equipment matches the first radio frequency information of the handover area.

The first radio frequency information may map to the geographical information of the handover area, and the second radio frequency information may map to the geographical information of the location of the user equipment. Therefore, it may be determined, by detecting whether the second radio frequency information reported by the user equipment matches the first radio frequency information of the handover area, whether the user equipment that reports the second radio frequency information already approaches the handover area.

104. If they match, send a measurement instruction message to the user equipment that reports the second radio frequency information, so as to instruct the user equipment to measure signal strength and/or signal quality of a cell at a frequency of a cell of a second base station or only of the cell of the second base station.

If it is detected that the second radio frequency information reported by the user equipment matches the first radio frequency information of the handover area, it may be determined that the user equipment that reports the second radio frequency information already approaches the handover area; in this case, the first base station may send the measurement instruction message to the user equipment that reports the second radio frequency information, where the second radio frequency information matches the first radio frequency information of the handover area, and the measurement instruction message includes frequency information of the cell of the second base station and/or an identifier of the cell of the second base station and may instruct the user equipment to measure the signal strength and/or signal quality of the cell at the frequency of the cell of the second base station or measure the signal strength and/or signal quality only of the cell of the second base station.

A target base station whose signal strength and/or signal quality exceeds a preset threshold may be obtained by measuring the signal strength and/or signal quality. The user equipment that measures the signal strength and/or signal quality may report a result of the measurement to the first base station in a form of a measurement report. If the result of the measurement satisfies a handover condition, the first base station may send a handover request to a target cell according to the measurement report; the target base station determines, according to a resource condition of a cell of the target base station, to admit the user equipment, and sends a handover response to the first base station; the first base station sends a handover command to the user equipment; and the user equipment hands over to the cell of the target base station.

Figure 2:
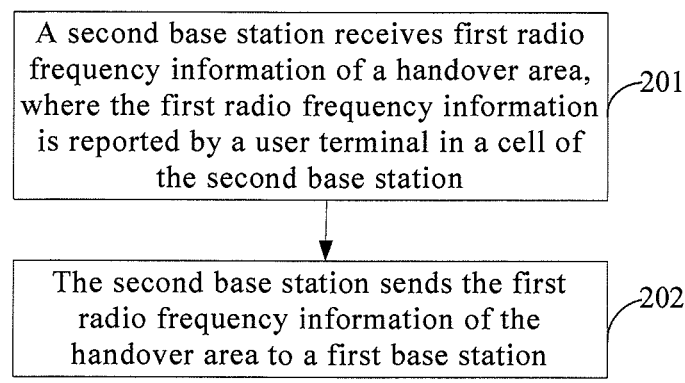
FIG. 2 is a flowchart of a cell discovery method according to Embodiment 1.

A method further provided in this embodiment of the present invention is used on a side of a second base station, and as shown in FIG. 2, includes the following steps:

201. The second base station receives first radio frequency information of a handover area, where the first radio frequency information is reported by a user equipment served by a cell of the second base station.

Before handing over to a cell of a first base station, the user equipment that is located in the handover area and served by the cell of the second base station may send the first radio frequency information to the second base station, where the first radio frequency information is measured by the user equipment at a location of the user equipment, the first radio frequency information is radio frequency information of the handover area, the first radio frequency information is obtained, by means of measurement, by the user equipment located in the handover area, and the first radio frequency information may map to geographical information of the handover area.

202. The second base station sends the first radio frequency information of the handover area to a first base station.

The second base station may send the first radio frequency information of the handover area to the first base station over an X2, IUR, S1, IU interface or over a radio air interface (for example, a microwave interface or an interface between a host base station and a relay node), so that the first base station instructs, according to the first radio frequency information of the handover area, the user equipment to measure signal strength and/or signal quality of a cell at a frequency of the cell of the second base station or only of the cell of the second base station, where actions of the first base station are specifically described in the case in which the cell discovery method is used on a side of the first base station, and no further details are provided herein.

According to a cell discovery method provided in this embodiment of the present invention, a first base station receives first radio frequency information of a handover area and receives second radio frequency information that is reported by a user equipment served by a cell of the first base station; then detects whether the second radio frequency information reported by the user equipment matches the first radio frequency information of the handover area; and if they match, sends a measurement instruction message to the user equipment that reports the second radio frequency information, so as to instruct the user equipment to measure signal strength and/or signal quality of a cell at a frequency of a cell of a second base station or only of the cell of the second base station. In this way, small-scale search and measurement can be purposefully performed, thereby improving the search efficiency and achieving a power saving effect.

Figure 3:
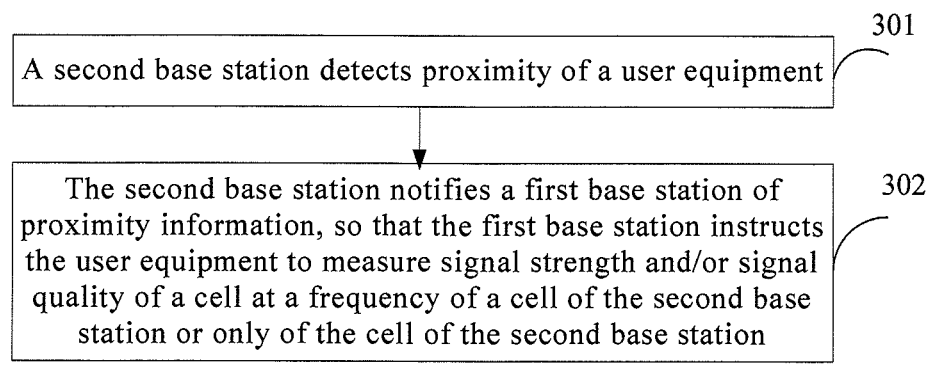
FIG. 3 is a flowchart of another cell discovery method according to Embodiment 1.

This embodiment of the present invention further provides a cell discovery method. The method is used on a side of a second base station. As shown in FIG. 3, the method includes the following steps:

301. The second base station detects proximity of a user equipment.

A receiver is arranged on an apparatus of the second base station; therefore, an uplink receiving function is supported and an uplink message sent by the user equipment is detected, so as to detect that the user equipment approaches the second base station.

302. The second base station notifies a first base station of proximity information, so that the first base station instructs a user equipment to measure signal strength and/or signal quality of a cell at a frequency of a cell of the second base station or only of the cell of the second base station.

The second base station may notify the first base station of the proximity information over an X2, IUR, S1, and IU interface, or a radio air interface (for example, a microwave interface or an interface between a host base station and a relay node).

When detecting the proximity of the user equipment, the second base station may notify the first base station of the information in a form of the proximity information, where the proximity information includes some information about the user equipment that approaches the second base station and frequency information of the cell of the second base station and/or an identifier of the cell of the second base station; and the first base station instructs, according to the proximity information, the user equipment that approaches the second base station to measure the signal strength and/or signal quality at the frequency of the second base station or measure the signal strength and/or signal quality only for the second base station.

A target base station whose signal strength and/or signal quality exceeds a preset threshold may be obtained by measuring the signal strength and/or signal quality. The user equipment that measures the signal strength and/or signal quality may report a result of the measurement to the first base station in a form of a measurement report. If the result of the measurement satisfies a handover condition, the first base station may send a handover request to a target cell according to the measurement report; the target base station determines, according to a resource condition of a cell of the target base station, to admit the user equipment, and sends a handover response to the first base station; the first base station sends a handover command to the user equipment; and the user equipment hands over to the cell of the target base station.

According to a cell discovery method further provided in this embodiment of the present invention, a second base station detects proximity of a user equipment and notifies a first base station of proximity information, so that the first base station instructs the user equipment to measure signal quality. In this way, small-scale search and measurement can be purposefully performed, thereby improving the search efficiency and achieving a power saving effect.

Figure 4:
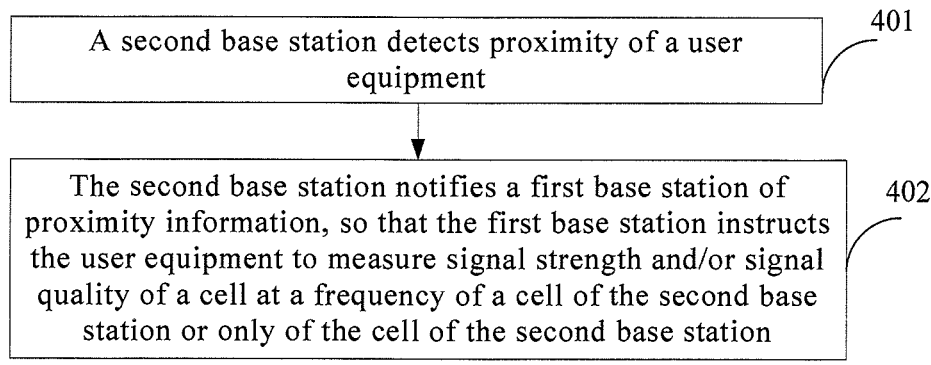
FIG. 4 is a flowchart of another cell discovery method according to Embodiment 1.

This embodiment of the present invention further provides a cell discovery method. The method is used on a side of a first base station. As shown in FIG. 4, the method includes the following steps:

401. The first base station receives first radio frequency information of a handover area.

The first radio frequency information is radio frequency information of the handover area. The first radio frequency information is obtained, by means of measurement, by a user equipment that is located in the handover area. The first radio frequency information may map to geographical information of the handover area.

402. The first base station broadcasts, in a system message, the first radio frequency information of the handover area, so that when second radio frequency information acquired by a user equipment matches the first radio frequency information of the handover area, the user equipment measures signal strength and/or signal quality of a cell at a frequency of a cell of a second base station or only of the cell of the second base station.

After receiving the first radio frequency information of the handover area, the first base station broadcasts, in the system message, the first radio frequency information, so that all user equipments served by a cell of the first base station may receive the first radio frequency information. The user equipment may periodically measure the second radio frequency information in an area where the user equipment is located, and therefore, the second radio frequency information may map to geographical information of a location of the user equipment. If the user equipment detects that the second radio frequency information matches the first radio frequency information of the handover area, it may be determined that the user equipment already approaches the handover area; in this case, the user equipment may be activated to measure the signal strength and/or signal quality at the frequency of the cell of the second base station or measure the signal strength and/or signal quality only of the cell of the second base station.

A target base station whose signal strength and/or signal quality exceeds a preset threshold may be obtained by measuring the signal strength and/or signal quality. The user equipment that measures the signal strength and/or signal quality may report a result of the measurement to the first base station in a form of a measurement report. If the result of the measurement satisfies a handover condition, the first base station may send a handover request to a target cell according to the measurement report; the target base station determines, according to a resource condition of a cell of the target base station, to admit the user equipment, and sends a handover response to the first base station; the first base station sends a handover command to the user equipment; and the user equipment hands over to the cell of the target base station.

Figure 5:
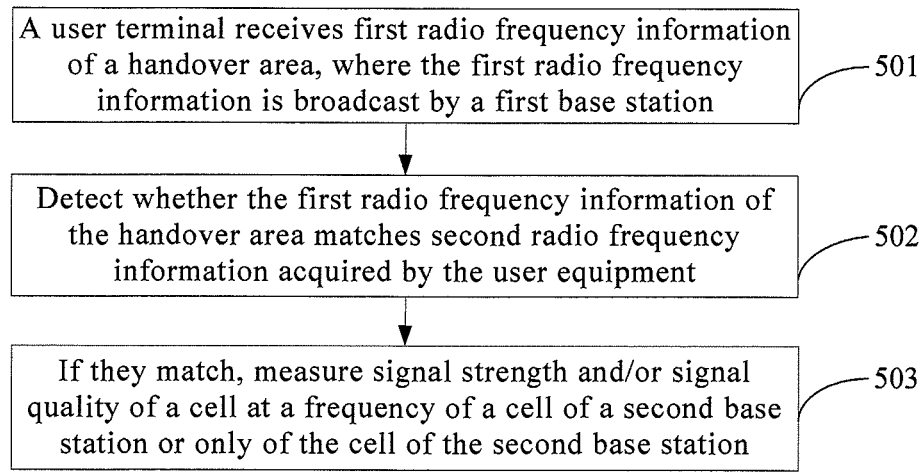
FIG. 5 is a flowchart of another cell discovery method according to Embodiment 1.

A method used on a side of a user equipment is provided, and as shown in FIG. 5, includes the following steps:

501. The user equipment receives first radio frequency information of a handover area, where the first radio frequency information is broadcast by a first base station.

The handover area is an area covering locations of all user equipments that hand over from a cell of a second base station to a cell of the first base station.

The first radio frequency information is radio frequency information of the handover area. The first radio frequency information is obtained, by means of measurement, by the user equipment that is located in the handover area. It may be learned from the manner for obtaining the first radio frequency information that the first radio frequency information may map to geographical information of the handover area.

After receiving the first radio frequency information of the handover area, the first base station broadcasts, in a system message, the first radio frequency information, so that all user equipments served by the cell of the first base station may receive the first radio frequency information.

502. Detect whether the first radio frequency information of the handover area matches second radio frequency information acquired by the user equipment.

The user equipment may periodically measure the second radio frequency information in an area where the user equipment is located, and therefore, the second radio frequency information may map to geographical information of a location of the user equipment. The user equipment automatically detects whether the second radio frequency information matches the first radio frequency information of the handover area, so as to determine whether the user equipment already approaches the handover area.

503. If they match, measure signal strength and/or signal quality of a cell at a frequency of a cell of a second base station or only of the cell of the second base station.

If the user equipment detects that the second radio frequency information matches the first radio frequency information of the handover area, it may be determined that the user equipment already approaches the handover area; in this case, the user equipment may start to measure the signal strength and/or signal quality at the frequency of the cell of the second base station or measure the signal strength and/or signal quality only of the cell of the second base station.

A target base station whose signal strength and/or signal quality exceeds a preset threshold may be obtained by measuring the signal strength and/or signal quality. The user equipment that measures the signal strength and/or signal quality may report a result of the measurement to the first base station in a form of a measurement report. If the result of the measurement satisfies a handover condition, the first base station may send a handover request to a target cell according to the measurement report; the target base station determines, according to a resource condition of a cell of the target base station, to admit the user equipment, and sends a handover response to the first base station; the first base station sends a handover command to the user equipment; and the user equipment hands over to the cell of the target base station.

According to a cell discovery method further provided in this embodiment of the present invention, a first base station receives first radio frequency information of a handover area that is located between the first base station and a second base station; and broadcasts, in a system message, the first radio frequency information of the handover area, so that when second radio frequency acquired by a user equipment matches the first radio frequency information of the handover area, the user equipment measures signal strength and/or signal quality of a cell at a frequency of a cell of the second base station or only of the cell of the second base station. In this way, small-scale search and measurement can be purposefully performed, thereby improving the search efficiency and achieving a power saving effect.

In a practical application, in Embodiment 1 of the present invention, the first base station may be a macro base station, and the second base station may be a low-power base station or a macro base station. The low-power base station includes but is not limited to a pico base station, an RRH (remote radio head), an RRU (radio remote unit), a Relay (relay), an NB (NodeB, base station node), a BS (base station), a femto (home base station), an LTE HIFI (high-speed network), WIFI (wireless broadband), a user equipment in D2D, or the like.

Embodiment 2

Figure 6:
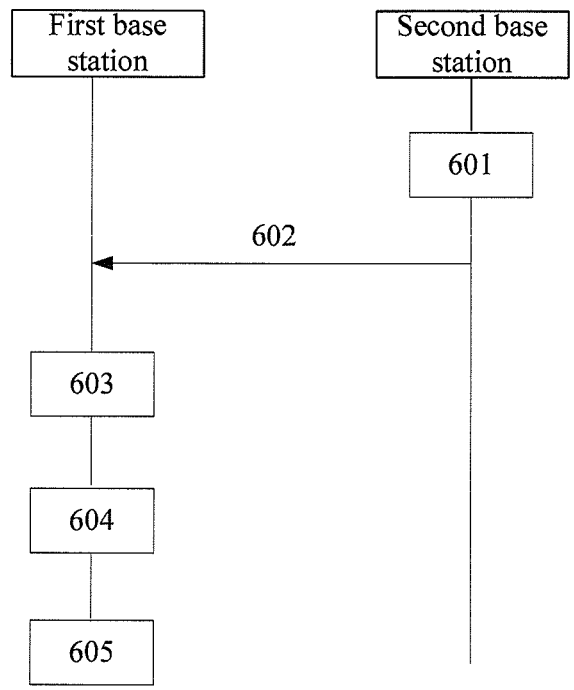
FIG. 6 is a flowchart of another cell discovery method according to Embodiment 2.

This embodiment of the present invention provides a cell discovery method. As shown in FIG. 6, the method includes the following steps:

601. A second base station receives first radio frequency information of a handover area, where the first radio frequency information is reported by a user equipment in a cell of the second base station.

The first radio frequency information of the handover area includes at least one of the following items: RSRP (reference signal received power), RSRQ (reference signal received quality), and an AOA (angle of arrival).

The user equipment served by the cell of the second base station is located in the handover area; before handing over to a cell of a first base station, the user equipment may send the first radio frequency information to the second base station, where the first radio frequency information is measured by the user equipment at a location of the user equipment, the first radio frequency information is radio frequency information of the handover area, the first radio frequency information is obtained, by means of measurement, by the user equipment located in the handover area, and the first radio frequency information may map to geographical information of the handover area. The user equipment served by the cell of the second base station reports the first radio frequency information of the handover area to the second base station.

602. The second base station sends the first radio frequency information of the handover area to a first base station.

After receiving the first radio frequency information of the handover area, the second base station sends the information to the first base station, where the first radio frequency information is reported by the user equipment in the cell of the second base station; and the first base station receives the first radio frequency information of the handover area, where the first radio frequency information is sent by the second base station.

In the method descried in 601 to 602, the first base station receives the first radio frequency information of the handover area, where the first radio frequency information is sent by the second base station, and the first radio frequency information of the handover area is reported by the user equipment served by the cell of the second base station to the second base station.

Alternatively, the first base station may also receive the first radio frequency information of the handover area, where the first radio frequency information is sent by the user equipment that just hands over from the cell of the second base station to the cell of the first base station. When the user equipment completes the handover from the cell of the second base station to the cell of the first base station, a serving base station of the user equipment changes from the second base station to the first base station; in this case, the first base station activate the user equipment to measure the first radio frequency information in an area where the user equipment is located, and the user equipment sends the measured first radio frequency information of the handover area to the first base station.

603. The first base station receives second radio frequency information that is reported by the user equipment served by the cell of the first base station.

The second radio frequency information includes at least one of the following items: RSRP, RSRQ, and an AOA.

The user equipment served by the cell of the first base station may periodically report the second radio frequency information to the serving base station of the user equipment, namely, the first base station. The second radio frequency information is measured by the user equipment at the location of the user equipment, and therefore, the second radio frequency information may map to geographical information of the location of the user equipment.

604. Detect whether the second radio frequency information reported by the user equipment matches the first radio frequency information of the handover area.

The first radio frequency information may map to the geographical information of the handover area, and the second radio frequency information may map to the geographical information of the location of the user equipment. Therefore, it may be determined, by detecting whether the second radio frequency information reported by the user equipment matches the first radio frequency information of the handover area, whether the user equipment that reports the second radio frequency information already approaches the handover area.

Two methods for detecting whether the second radio frequency information matches the first radio frequency information are as follows:

One method is detecting whether the second radio frequency information reported by the user equipment falls within a radio frequency range value in the first radio frequency information of the handover area. For example, the second radio frequency information reported by the user equipment is an RSRP value, the first radio frequency information of the handover area is an RSRP range, and the radio frequency range in the first radio frequency information of the handover area is an RSRP range; in this case, the matching method is detecting whether the RSRP value in the second radio frequency information reported by the user equipment falls within the RSRP range in the first radio frequency information.

Certainly and alternatively, the second radio frequency information reported by the user equipment may include an RSRP value, and/or an RSRQ value, and/or an AOA value. Therefore, it may be detected whether the RSRP value, and/or the RSRQ value, and/or the AOA value in the second radio frequency information reported by the user equipment falls within an RSRP range, and/or an RSRQ range, and/or an AOA range in the first radio frequency information of the handover area. When radio frequency information includes any two or all of the RSRP value, the RSRQ value, and the AOA value, the method for detecting whether the second radio frequency information matches the first radio frequency information becomes more precise.

The other method is detecting whether a difference between the second radio frequency information reported by the user equipment and the first radio frequency information of the handover area is less than a preset radio frequency threshold. For example, the second radio frequency information reported by the user equipment is an RSRP value, the first radio frequency information of the handover area is an RSRP value, and a preset RSRP threshold is set on the first base station; in this case, the matching method is detecting whether a difference between the RSRP value in the second radio frequency information reported by the user equipment and the RSRP value in the first radio frequency information is less than the preset RSRP threshold.

Certainly and alternatively, the second radio frequency information reported by the user equipment may include an RSRP value, and/or an RSRQ value, and/or an AOA value. In this case, it may be detected whether a difference between the RSRP value, and/or the RSRQ value, and/or the AOA value in the second radio frequency information reported by the user equipment and an RSRP value, and/or an RSRQ value, and/or an AOA value in the first radio frequency information is less than a preset RSRP threshold, and/or a preset RSRQ threshold, and/or a preset AOA threshold. When radio frequency information includes any two or all of the RSRP value, the RSRQ value, and the AOA value, the method for detecting whether the second radio frequency information matches the first radio frequency information becomes more precise.

605. If the second radio frequency information matches the first radio frequency information, send a measurement instruction message to the user equipment that reports the second radio frequency information, so as to instruct the user equipment to measure signal strength and/or signal quality of a cell at a frequency of the cell of the second base station or only of the cell of the second base station.

If it is detected that the second radio frequency information reported by the user equipment matches the first radio frequency information of the handover area, it may be determined that the user equipment that reports the second radio frequency information already approaches the handover area; in this case, the first base station may send the measurement instruction message to the user equipment that reports the second radio frequency information, where the second radio frequency information matches the first radio frequency information of the handover area, and the measurement instruction message includes frequency information of the cell of the second base station and/or an identifier of the cell of the second base station and may instruct the user equipment to measure the signal strength and/or signal quality at the frequency of the cell of the second base station or measure the signal strength and/or signal quality only of the cell of the second base station.

A target base station whose signal strength and/or signal quality exceeds a preset threshold may be obtained by measuring the signal strength and/or signal quality. The user equipment that measures the signal strength and/or signal quality may report a result of the measurement to the first base station in a form of a measurement report. If the result of the measurement satisfies a handover condition, the first base station may send a handover request to a target cell according to the measurement report; the target base station determines, according to a resource condition of a cell of the target base station, to admit the user equipment, and sends a handover response to the first base station; the first base station sends a handover command to the user equipment; and the user equipment hands over to the cell of the target base station.

In a practical application, in Embodiment 2 of the present invention, the first base station may be a macro base station, and the second base station may be a low-power base station or a macro base station. The low-power base station includes but is not limited to a pico base station, an RRH (remote radio head), an RRU (radio remote unit), an Relay (relay), an NB (NodeB, base station node), a BS (base station), a femto (home base station), an LTE HIFI (high-speed network), WIFI (wireless broadband), a user equipment in D2D, or the like.

Figure 7:
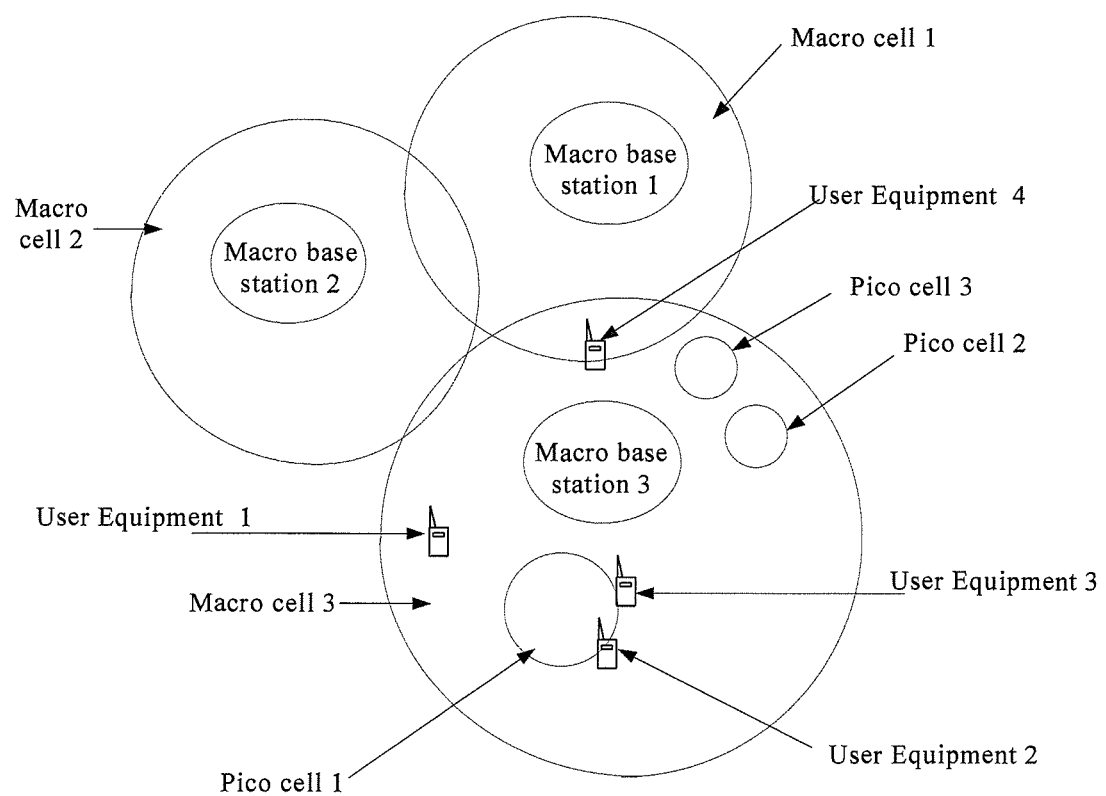
FIG. 7 is a diagram of an application scenario of a cell discovery method according to an embodiment.

The following uses an example to describe the method described in steps 601 to 606 in this embodiment. As shown in FIG. 7, in an application scenario of this embodiment, there are macro base station 1, macro base station 2, and macro base station 3, and cells covered by the three macro base stations are macro cell 1, macro cell 2, and macro cell 3. In macro cell 3, several low-power base stations are included, such as pico base station 1, pico base station 2, and pico base station 3. Several user equipments are served by macro cell 3, such as user equipment 1, user equipment 2, user equipment 3, and user equipment 4.

Firstly, pico base station 1, pico base station 2, and pico base station 3 may periodically send first radio frequency information of handover areas of pico cell 1, pico cell 2, and pico cell 3 to macro base station 1, macro base station 2, and macro base station 3 at a preset time interval, where the first radio frequency information includes RSRP range values and AOA range values of the handover areas that of pico cell 1, pico cell 2, and pico cell 3; and after receiving the first radio frequency information of the handover areas of pico cells 1, 2, and 3, macro base stations 1, 2, and 3 may store the information.

Alternatively, macro base stations 1, 2, and 3 may also receive the first radio frequency information of the handover area, where the first radio frequency information is sent by a user equipment that just hands over from a pico cell to a macro cell, for example, user equipment 3 in macro cell 3 just hands over from pico cell 1 to macro cell 3, then macro cell 3 activates user equipment 3 to measure first radio frequency information at a location of user equipment 3, user equipment 3 reports the first radio frequency information to macro base station 3, and macro base station 3 receives and stores the information.

User equipments 1, 2, 3, and 4 served by macro cell 3 may periodically send second radio frequency information at a preset time interval to their serving base station, namely, macro base station 3, where the second radio frequency information is measured by user equipments 1, 2, 3, and 4 at their locations, and the second radio frequency information includes RSRP values and AOA values of user equipments 1, 2, 3, and 4 at their locations.

Macro base station 3 detects whether the RSRP values and the AOA values in the received second radio frequency information fall within an RSRP range value and an AOA range value in the first radio frequency information; and it may be found by means of detection that an RSRP value 14 W and an AOA value 48 degree that are in second radio frequency information reported by user equipment 2 fall within an RSRP range value 10 W to 20 W and an AOA range value 45 degree to 60 degree that are in first radio frequency information of a handover area of pico cell 1, then macro base station 3 determines that user equipment 2 already approaches pico cell 1, and macro base station 3 may instruct user equipment 2 to measure signal quality of pico cell 1.

If a measurement report that is sent by user equipment 2 to macro base station 3 shows that the measured signal quality exceeds a preset threshold, macro base station 3 may send a handover request to pico base station 1; pico base station 1 determines, according to a resource condition of a cell of pico base station 1, to admit user equipment 2, and pico base station 1 sends a handover response to macro base station 3; macro base station 3 sends a handover command to user equipment 2; and user equipment 2 hands over to pico cell 1.

According to a cell discovery method provided in this embodiment of the present invention, a first base station receives first radio frequency information of a handover area and receives second radio frequency information that is reported by a user equipment served by a cell of the first base station; then detects whether the second radio frequency information reported by the user equipment matches the first radio frequency information of the handover area; and if the second radio frequency information matches the first radio frequency information, sends a measurement instruction message to the user equipment that reports the second radio frequency information, so as to instruct the user equipment to measure signal strength and/or signal quality of a cell at a frequency of a cell of a second base station or only of the cell of the second base station. In this way, small-scale search and measurement can be purposefully performed, thereby improving the search efficiency and achieving a power saving effect.

Embodiment 3

Figure 8:
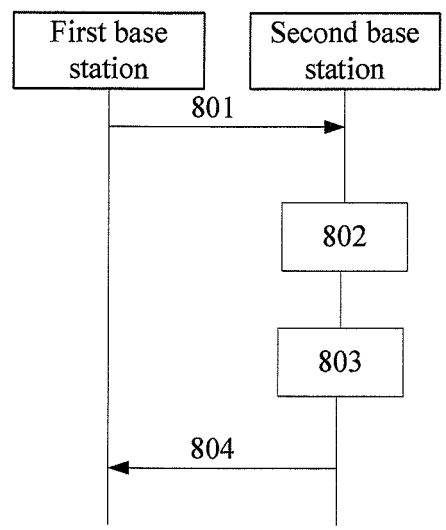
FIG. 8 is a flowchart of a cell discovery method according to Embodiment 3.

This embodiment of the present invention further provides a cell discovery method. As shown in FIG. 8, the method includes the following steps:

801. A second base station receives uplink resource information of a user equipment served by a cell of a first base station, where the uplink resource information is sent by the first base station.

The uplink resource information includes a C-RNTI (Cell Radio Network Temporary Identifier, cell radio network temporary identifier), a PCI (Physical Cell Identifier, physical cell identifier), an SRS (Sounding Reference Symbol, sounding reference symbol), and the like.

A receiver is arranged on the second base station and the receiver is capable of receiving an uplink signal of the user equipment served by the cell of the first base station; therefore, an uplink receiving function is supported, and the uplink resource information of the user equipment served by the cell of the first base station may be received over an X2 interface, an S1 interface, a private interface, or an air interface, where the uplink resource information is sent by the first base station.

802. The second base station detects the corresponding user equipment according to the uplink resource information.

The second base station performs detection according to the uplink resource information; and if it detects the corresponding user equipment, it may parse, according to the uplink resource information, an uplink signal sent by the corresponding user equipment.

803. The second base station detects that transmit power of the uplink signal of the corresponding user equipment exceeds a preset power threshold, and concludes that the user equipment approaches the second base station.

The receiver is arranged on the second base station; therefore, the uplink receiving function is supported, and an uplink signal sent by a user equipment can be detected; if the second base station detects that the transmit power of the uplink signal of the corresponding user equipment exceeds the preset power threshold, it may conclude that the user equipment approaches the second base station.

804. The second base station notifies the first base station of proximity information, so that the first base station instructs the user equipment to measure signal quality.

The proximity information includes a user identifier. The proximity information may carry frequency information of a cell of the second base station or/and an identifier of the cell of the second base station; and the first base station may identify, according to the user identifier, the user equipment that approaches the second base station, and instruct the user equipment to measure signal strength and/or signal quality at a frequency of the cell of the second base station or measure signal strength and/or signal quality only of the cell of the second base station.

A target base station whose signal strength and/or signal quality exceeds a preset threshold may be obtained by measuring the signal strength and/or signal quality. The user equipment that measures the signal strength and/or signal quality may report a result of the measurement to the first base station in a form of a measurement report. If the result of the measurement satisfies a handover condition, the first base station may send a handover request to a target cell according to the measurement report; the target base station determines, according to a resource condition of a cell of the target base station, to admit the user equipment, and sends a handover response to the first base station; the first base station sends a handover command to the user equipment; and the user equipment hands over to the cell of the target base station.

Figure 9:
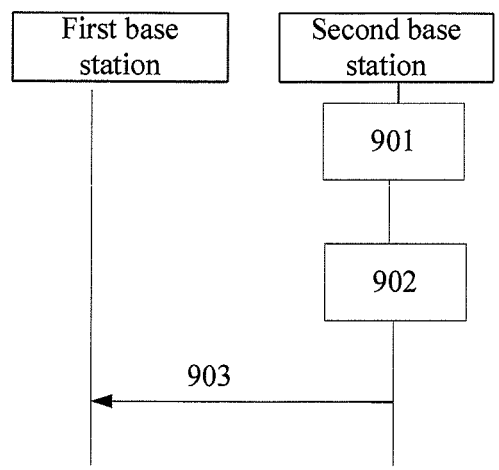
FIG. 9 is a flowchart of another cell discovery method according to Embodiment 3.

This embodiment of the present invention further provides a cell discovery method. As shown in FIG. 9, the method includes the following steps:

901. A second base station detects that transmit power of an uplink signal of a user equipment exceeds a preset power threshold, and it concludes that the user equipment approaches the second base station.

A receiver is arranged on the second base station and the receiver is capable of receiving an uplink signal of the user equipment served by a cell of a first base station; therefore, an uplink receiving function is supported, and an uplink message sent by the user equipment can be detected. If the second base station detects that the transmit power of the uplink signal of the user equipment exceeds the preset power threshold, it may conclude that the user equipment approaches the second base station.

902. Acquire resource information used by the user equipment that approaches the second base station and is detected by the second base station.

The second base station detects the uplink signal sent by the user equipment; and when it detects that the transmit power of the uplink signal of the user equipment exceeds the preset power threshold, it may identify the resource information used by the user equipment, where the resource information is resource information in a frequency domain, and/or a time domain, and/or a code domain, and/or a space domain.

The resource information in the frequency domain, and/or the time domain, and/or the code domain, and/or the space domain includes a physical resource block (PRB) index, and/or time domain information, and/or a code sequence index, and/or a space resource block index.

903. The second base station notifies a first base station of proximity information, so that the first base station instructs the user equipment to measure signal quality.

When detecting proximity of the user equipment, the second base station may notify the first base station of the information in a form of the proximity information, where the proximity information includes the resource information used by the user equipment, and the proximity information may carry frequency information of a cell of the second base station and/or an identifier of the cell of the second base station; and the first base station may identify, according to a user identifier and/or the resource information used by the user equipment in the proximity information, the user equipment that approaches the second base station, and instruct the user equipment to measure signal strength and/or signal quality at a frequency of the cell of the second base station or measure signal strength and/or signal quality only of the cell of the second base station.

A target base station whose signal strength and/or signal quality exceeds a preset threshold may be obtained by measuring the signal strength and/or signal quality. The user equipment that measures the signal strength and/or signal quality may report a result of the measurement to the first base station in a form of a measurement report. If the result of the measurement satisfies a handover condition, the first base station may send a handover request to a target cell according to the measurement report; the target base station determines, according to a resource condition of a cell of the target base station, to admit the user equipment, and sends a handover response to the first base station; the first base station sends a handover command to the user equipment; and the user equipment hands over to the cell of the target base station.

In a practical application, in Embodiment 3 of the present invention, the first base station may be a macro base station, and the second base station may be a low-power base station or a macro base station. The low-power base station includes but is not limited to a pico base station, an RRH (remote radio head), an RRU (radio remote unit), a Relay (relay), an NB (NodeB, base station node), a BS (base station), a femto (home base station), an LTE HIFI (high-speed network), WIFI (wireless broadband), a user equipment in D2D, or the like.

The following uses an example to describe the methods described in steps 801 to 804 and steps 901 to 903 in this embodiment. As shown in FIG. 7, in an application scenario of this embodiment, there are macro base station 1, macro base station 2, and macro base station 3, and cells covered by the three macro base stations are macro cell 1, macro cell 2, and macro cell 3. In macro cell 3, several low-power base stations are included, such as pico base station 1, pico base station 2, and pico base station 3. User equipments served by macro cell 3 are user equipment 1, user equipment 2, user equipment 3, and user equipment 4.

Receivers are arranged on pico base stations 1, 2, and 3, and an uplink receiving function is supported. Macro base station 3 sends to pico base stations 1, 2, and 3, over an X2 interface, an S1 interface, a private interface, or an air interface, uplink resource information of user equipments 1, 2, 3, and 4 that are served by macro cell 3, where the uplink resource information includes a C-RNTI (Cell Radio Network Temporary Identifier, cell radio network temporary identifier), a PCI (Physical Cell Identifier, physical cell identifier), an SRS (Sounding Reference Symbol, sounding reference symbol), and the like. Pico base stations 1, 2, and 3 perform detection over the air interface according to the uplink resource information, and may detect user equipments 1, 2, 3, and 4 and parse user identifiers UEID1, UEID2, UEID3, UEID4 of user equipments 1, 2, 3, and 4 from the uplink resource information of the corresponding user equipments. After detecting the corresponding user equipments, pico base stations 1, 2, and 3 detect uplink information sent by the user equipment, where pico base station 1 may detect that transmit power of an uplink signal of user equipment 2 is 30 W and this exceeds the preset power threshold 20 W, and it may conclude that user equipment 2 approaches pico cell 1; pico base station 1 sends the user identifier UEID2 of user equipment 2 to macro base station 3, and then, macro base station 3 instructs, according to the received user identifier UEID2, user equipment 2 to measure signal quality of pico cell 1.

Alternatively, a pico base station may also not receive uplink resource information sent by a macro base station. When detecting that the transmit power of the uplink signal of user equipment 2 exceeds the preset power threshold, pico base station 1 may also detect resource information used by user equipment 2. The resource information includes at least one of the following items: a physical resource block (PRB) index, time domain information, a code sequence index, and a space resource block index.

Pico base station 1 sends the user identifier UEID2 of user equipment 2 or resource information of user equipment 2 in a frequency domain, and/or a time domain, and/or a code domain, and/or a space domain to macro base station 3. Macro base station 3 instructs, according to the received user identifier UEID2, user equipment 2 to measure the signal quality of pico cell 1; or because resource information of user equipment 2 in a serving cell, namely, macro cell 3, is configured by a serving macro base station, macro base station 3 may identify user equipment 2 according to the resource information of user equipment 2 in the frequency domain, and/or the time domain, and/or the code domain, and/or the space domain, and instruct user equipment 2 to measure the signal quality of pico cell 1.

If a measurement report that is sent by user equipment 2 to macro base station 3 shows that the measured signal quality exceeds the preset threshold, macro base station 3 may send a handover request to pico base station 1; pico base station 1 determines, according to a resource condition of a cell of pico base station 1, to admit user equipment 2, and pico base station 1 sends a handover response to macro base station 3; macro base station 3 sends a handover command to user equipment 2; and user equipment 2 hands over to pico cell 1.

According to a cell discovery method further provided in this embodiment of the present invention, a second base station detects proximity of a user equipment and notifies a first base station of proximity information, so that the first base station instructs the user equipment to measure signal quality. In this way, small-scale search and measurement can be purpose fully performed, thereby improving the search efficiency and achieving a power saving effect.

Embodiment 4

Figure 10:
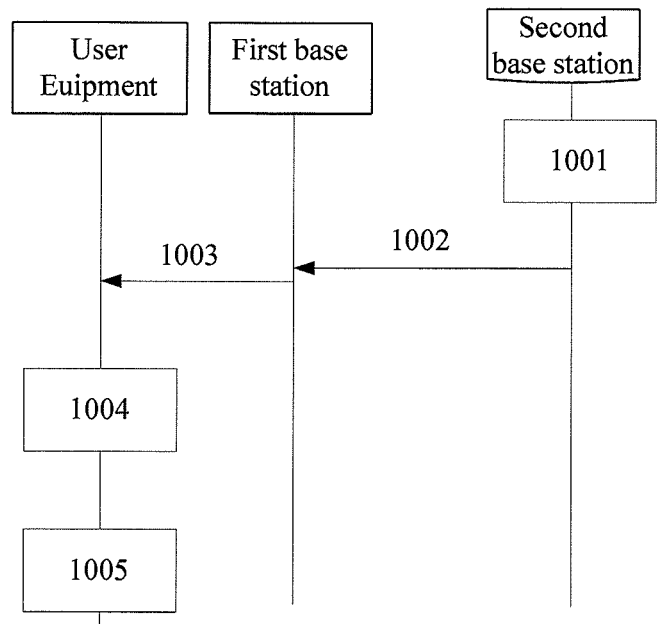
FIG. 10 is a flowchart of a cell discovery method according to Embodiment 4.

This embodiment of the present invention further provides a cell discovery method. As shown in FIG. 10, the method includes the following steps:

1001. A second base station receives first radio frequency information of a handover area, where the first radio frequency information is reported by a user equipment in a cell of the second base station.

The first radio frequency information of the handover area includes reference signal received power, RSRP, and/or reference signal received quality, RSRQ, and/or an angle of arrival, AOA.

The user equipment served by the cell of the second base station is located in the handover area; before handing over to a cell of a first base station, the user equipment may send the first radio frequency information to the second base station, where the first radio frequency information is measured by the user equipment at a location of the user equipment, the first radio frequency information is radio frequency information of the handover area, the first radio frequency information is obtained, by means of measurement, by the user equipment located in the handover area, and the first radio frequency information may map to geographical information of the handover area. The user equipment served by the cell of the second base station reports the first radio frequency information of the handover area to the second base station.

1002. The second base station sends the first radio frequency information of the handover area to a first base station.

After receiving the first radio frequency information of the handover area, the second base station sends the information to the first base station, where the first radio frequency information is reported by the user equipment in the cell of the second base station; and the first base station receives the first radio frequency information of the handover area, where the first radio frequency information is sent by the second base station.

In the method descried in 1001 to 1002, the first base station receives the first radio frequency information of the handover area, where the first radio frequency information is sent by the second base station, and the first radio frequency information of the handover area is reported by the user equipment served by the cell of the second base station to the second base station.

Alternatively, the first base station may also receive the first radio frequency information of the handover area, where the first radio frequency information is sent by the user equipment that just hands over from the cell of the second base station to the cell of the first base station. When the user equipment completes the handover from the cell of the second base station to the cell of the first base station, a serving base station of the user equipment changes from the second base station to the first base station; in this case, the first base station activates the user equipment to measure the first radio frequency information in an area where the user equipment is located, and the user equipment sends the measured first radio frequency information of the handover area to the first base station.

1003. The first base station broadcast, in a system message, the first radio frequency information of the handover area.

After receiving the first radio frequency information of the handover area, the first base station broadcasts, in the system message, the first radio frequency information, so that all user equipments served by the cell of the first base station may receive the first radio frequency information.

1004. The user equipment detects whether the first radio frequency information of the handover area matches second radio frequency information acquired by the user equipment.

The second radio frequency information includes reference signal received power, RSRP, and/or reference signal received quality, RSRQ, and/or an angle of arrival, AOA.

The user equipment may periodically measure the second radio frequency information in an area where the user equipment is located, and therefore, the second radio frequency information may map to geographical information of a location of the user equipment. The user equipment automatically detects whether the second radio frequency information matches the first radio frequency information of the handover area, so as to determine whether the user equipment already approaches the handover area.

Two methods for detecting whether the second radio frequency information matches the first radio frequency information are as follows:

One method is detecting whether the second radio frequency information reported by the user equipment falls within a radio frequency range value in the first radio frequency information of the handover area. For example, the second radio frequency information reported by the user equipment is an RSRP value, the first radio frequency information of the handover area is an RSRP range, and the radio frequency range in the first radio frequency information of the handover area is the RSRP range; in this case, the matching method is detecting whether the RSRP value in the second radio frequency information reported by the user equipment falls within the RSRP range in the first radio frequency information.

Certainly and alternatively, the second radio frequency information reported by the user equipment may include an RSRP value, and/or an RSRQ value, and/or an AOA value. Therefore, it may be detected whether the RSRP value, and/or the RSRQ value, and/or the AOA value in the second radio frequency information reported by the user equipment falls within a range value of an RSRP value, and/or an RSRQ value, and/or an AOA value that is formed by an RSRP value, and/or an RSRQ value, and/or an AOA value in the first radio frequency information of the handover area. When radio frequency information includes any two or all of the RSRP value, the RSRQ value, and the AOA value, the method for detecting whether the second radio frequency information matches the first radio frequency information becomes more precise.

The other method is detecting whether a difference between the second radio frequency information reported by the user equipment and the first radio frequency information of the handover area is less than a preset radio frequency threshold. For example, the second radio frequency information reported by the user equipment is an RSRP value, the first radio frequency information of the handover area is an RSRP value, and a preset RSRP threshold is set on the first base station; in this case, the matching method is detecting whether a difference between the RSRP value in the second radio frequency information reported by the user equipment and the RSRP value in the first radio frequency information is less than the preset RSRP threshold.

Certainly and alternatively, the second radio frequency information reported by the user equipment may include an RSRP value, and/or an RSRQ value, and/or an AOA value. In this case, it may be detected whether a difference between the RSRP value, and/or the RSRQ value, and/or the AOA value in the second radio frequency information reported by the user equipment and an RSRP value, and/or an RSRQ value, and/or an AOA value in the first radio frequency information is less than a preset RSRP threshold, and/or a preset RSRQ threshold, and/or a preset AOA threshold. When radio frequency information includes any two or all of the RSRP value, the RSRQ value, and the AOA value, the method for detecting whether the second radio frequency information matches the first radio frequency information becomes more precise.

1005. If the second radio frequency information matches the first radio frequency information, measure signal strength and/or signal quality of a cell at a frequency of the cell of the second base station or only of the cell of the second base station.

If the user equipment detects that the second radio frequency information matches the first radio frequency information of the handover area, it may be determined that the user equipment already approaches the handover area.

In this case, if the user equipment is in idle state, the user equipment automatically starts to measure the signal strength and/or signal quality of the cell at the frequency of the cell of the second base station or only of the cell of the second base station.

If the user equipment is in connected state, the user equipment sends a user notification message to the first base station; and the first base station instructs, according to the received user notification message, the user equipment to measure the signal quality.

In a practical application, in Embodiment 4 of the present invention, the first base station may be a macro base station, and the second base station may be a low-power base station or a macro base station. The low-power base station includes but is not limited to a pico base station, an RRH (remote radio head), an RRU (radio remote unit), a Relay (relay), an NB (NodeB, base station node), a BS (base station), a femto (home base station), an LTE HIFI (high-speed network), WIFI (wireless broadband), a user equipment in D2D, or the like.

The following uses an example to describe the method described in steps 1001 to 1005 in this embodiment.

As shown in FIG. 7, in an application scenario of this embodiment, there are macro base station 1, macro base station 2, and macro base station 3, and cells covered by the three macro base stations are macro cell 1, macro cell 2, and macro cell 3. In macro cell 3, several low-power base stations are included, such as pico base station 1, pico base station 2, and pico base station 3. Several user equipments are served by macro cell 3, such as user equipment 1, user equipment 2, user equipment 3, and user equipment 4.

Firstly, pico base station 1, pico base station 2, and pico base station 3 may periodically send first radio frequency information of handover areas of pico cell 1, pico cell 2, and pico cell 3 to macro base station 1, macro base station 2, and macro base station 3 at a preset time interval, where the first radio frequency information includes RSRP range values and AOA range values of the handover areas of pico cell 1, pico cell 2, and pico cell 3; and after receiving the first radio frequency information of the handover areas of pico cells 1, 2, and 3, macro base stations 1, 2, and 3 may store the information.

Alternatively, macro base stations 1, 2, and 3 may also receive the first radio frequency information of the handover area, where the first radio frequency information is sent by a user equipment that just hands over from a pico cell to a macro cell, for example, user equipment 3 in macro cell 3 just hands over from pico cell 1 to macro cell 3, then macro cell 3 activates user equipment 3 to measure first radio frequency information at a location of user equipment 3, user equipment 3 reports the first radio frequency information to macro base station 3, and macro base station 3 receives and stores the information.

Macro base stations 1, 2, and 3 broadcast, in a system message, the first radio frequency information, so that all user equipments served by macro base stations 1, 2, and 3 receive the first radio frequency information. For example, user equipments 1, 2, 3, and 4 served by macro base station 3 all receive the first radio frequency information, and user equipments 1, 2, 3, and 4 may periodically measure, at a preset time, second radio frequency information at their locations, where the second radio frequency information is measured by user equipments 1, 2, 3, and 4 at their locations, and the second radio frequency information includes RSRP values and AOA values of user equipments 1, 2, 3, and 4 at their locations.

User equipments 1, 2, 3, and 4 detect whether the RSRP values and the AOA values in the second radio frequency information measured by themselves fall within RSRP range values and AOA range values in the first radio frequency information. User equipment 2 finds by means of detection that an RSRP value 14 W and an AOA value 48 degree that are in second radio frequency information measured by user equipment 2 fall within an RSRP range value 10 W to 20 W and an AOA range value 45 degree to 60 degree that are in first radio frequency information of a handover area of pico cell 1; then the user equipment 2 determines that it already approaches pico cell 1.

If user equipment 2 is in idle state, user equipment 2 automatically starts to measure signal quality of pico cell 1.

If user equipment 2 is in connected state, user equipment 2 sends a user notification message to macro base station 3; and macro base station 3 instructs, according to received the user notification message, user equipment 2 to measure the signal quality of pico cell 1.

According to a cell discovery method further provided in this embodiment of the present invention, a first base station receives first radio frequency information of a handover area that is located between the first base station and a second base station; and broadcasts, in a system message, the first radio frequency information of the handover area, so that the user equipment measures signal quality when second radio frequency information acquired by a user equipment matches the first radio frequency information of the handover area. In this way, small-scale search and measurement can be purposefully performed, thereby improving the search efficiency and achieving a power saving effect.

Embodiment 5

Figure 11:
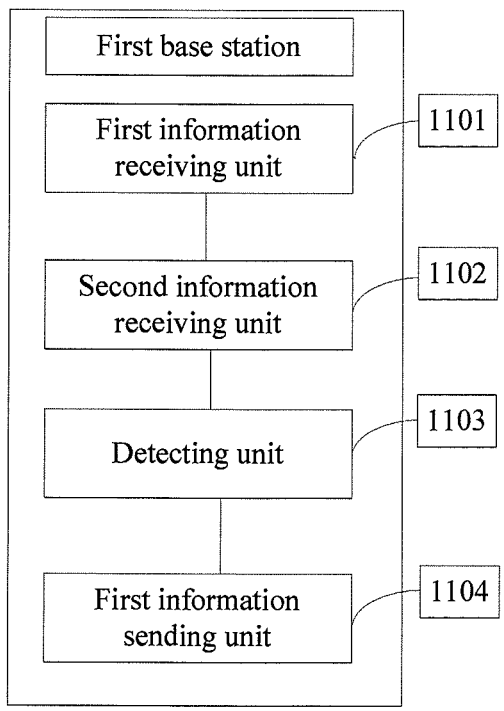
FIG. 11 is a structural block diagram of a first base station according to Embodiment 5.

This embodiment of the present invention provides a first base station. As shown in FIG. 11, the first base station includes: a first information receiving unit 1101, a second information receiving unit 1102, a detecting unit 1103, and a first information sending unit 1104.

The first information receiving unit 1101 is configured to receive first radio frequency information of a handover area.

Specifically, the first information receiving unit 1101 is configured to receive the first radio frequency information of the handover area, where the first radio frequency information is sent by a second base station, and the first radio frequency information of the handover area is reported by a user equipment served by a cell of the second base station to the second base station.

Alternatively, the first information receiving unit 1101 may also be configured to receive the first radio frequency information of the handover area, where the first radio frequency information is sent by the user equipment that just hands over from the cell of the second base station to a cell of the first base station.

The first radio frequency information is radio frequency information of the handover area. The first radio frequency information is obtained, by means of measurement, by the user equipment that is located in the handover area. The first radio frequency information may map to geographical information of the handover area.

The second information receiving unit 1102 is configured to receive second radio frequency information that is reported by a user equipment served by the cell of the first base station.

The user equipment served by the cell of the first base station may periodically report, at a preset time interval, the second radio frequency information to the first base station that serves the user equipment. The second radio frequency information is measured by the user equipment at a location of the user equipment, and therefore, the second radio frequency information may map to geographical information of the location of the user equipment.

The detecting unit 1103 is configured to detect whether the second radio frequency information reported by the user equipment matches the first radio frequency information of the handover area.

The first radio frequency information may map to the geographical information of the handover area, and the second radio frequency information may map to the geographical information of the location of the user equipment. Therefore, it may be determined, by detecting whether the second radio frequency information reported by the user equipment matches the first radio frequency information of the handover area, whether the user equipment that reports the second radio frequency information already approaches the handover area.

A method for detecting whether the second radio frequency information matches the first radio frequency information may specifically be: detecting whether the second radio frequency information reported by the user equipment falls within a radio frequency range value in the first radio frequency information of the handover area; or detecting whether a difference between the second radio frequency information reported by the user equipment and the first radio frequency information of the handover area is less than a preset radio frequency threshold.

The first information sending unit 1104 is configured to send, when the detecting unit detects that the second radio frequency information matches the first radio frequency information, a measurement instruction message to the user equipment that reports the second radio frequency information, so as to instruct the user equipment to measure signal strength and/or signal quality of a cell at a frequency of the cell of the second base station or only of the cell of the second base station.

If it is detected that the second radio frequency information reported by the user equipment matches the first radio frequency information of the handover area, it may be determined that the user equipment that reports the second radio frequency information already approaches the handover area; in this case, the first base station may send the measurement instruction message to the user equipment that reports the second radio frequency information, where the second radio frequency information matches the first radio frequency information of the handover area, and the measurement instruction message includes frequency information of the cell of the second base station and/or an identifier of the cell of the second base station and may instruct the user equipment to measure the signal strength and/or signal quality at the frequency of the cell of the second base station or measure the signal strength and/or signal quality only of the cell of the second base station.

The first radio frequency information of the handover area and the second radio frequency information that is reported by the user equipment include reference signal received power, RSRP, and/or reference signal received quality, RSRQ, and/or an angle of arrival, AOA.

The first base station provided in this embodiment may be used to implement the corresponding method in the embodiment shown in FIG. 1.

Figure 12:
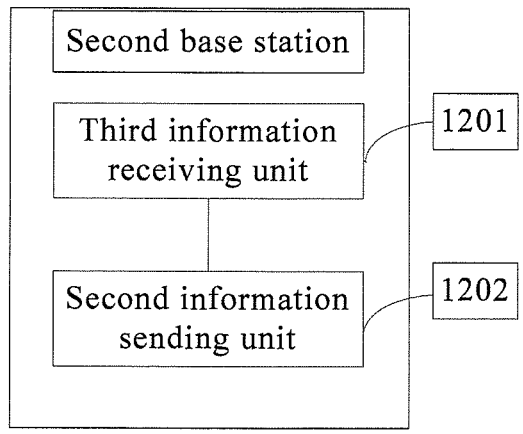
FIG. 12 is a structural block diagram of a second base station according to Embodiment 5.

This embodiment of the present invention further provides a second base station. As shown in FIG. 12, the second base station includes a third information receiving unit 1201 and a second information sending unit 1202.

The third information receiving unit 1201 is configured to receive first radio frequency information of a handover area, where the first radio frequency information is reported by a user equipment in a cell of the second base station.

The handover area is an area covering locations of all user equipments that hand over from the cell of the second base station to a cell of a first base station. The user equipment served by the cell of the second base station is located in the handover area; before handing over to the cell of the first base station, the user equipment may send the first radio frequency information to the second base station, where the first radio frequency information is measured by the user equipment at a location of the user equipment, the first radio frequency information is radio frequency information of the handover area, the first radio frequency information is obtained, by means of measurement, by the user equipment located in the handover area, and the first radio frequency information may map to geographical information of the handover area.

The second information sending unit 1202 is configured to send the first radio frequency information of the handover area to the first base station, so that the first base station instructs, according to the first radio frequency information of the handover area, the user equipment to measure signal strength and/or signal quality of a cell at a frequency of the cell of the second base station or only of the cell of the second base station.

The second base station may send the first radio frequency information of the handover area to the first base station over an X2, IUR, S1, or IU interface. The first radio frequency information of the handover area includes reference signal received power, RSRP, and/or reference signal received quality, RSRQ, and/or an angle of arrival, AOA.

The second base station may periodically send, at a preset time interval, the first radio frequency information of the handover area to the first base station, so that the first base station instructs, according to the first radio frequency information of the handover area, the user equipment to measure the signal quality. Actions of the first base station are already described in detail in the foregoing part about the first base station. No further details are provided herein.

A target base station whose signal strength and/or signal quality exceeds a preset threshold may be obtained by measuring the signal strength and/or signal quality. The user equipment that measures the signal strength and/or signal quality may report a result of the measurement to the first base station in a form of a measurement report. If the result of the measurement satisfies a handover condition, the first base station may send a handover request to a target cell according to the measurement report; the target base station determines, according to a resource condition of a cell of the target base station, to admit the user equipment, and sends a handover response to the first base station; the first base station sends a handover command to the user equipment; and the user equipment hands over to the cell of the target base station.

The second base station provided in this embodiment of the present invention may be used to implement the corresponding method in the embodiment shown in FIG. 2.

According to a first base station and a second base station that are provided in this embodiment of the present invention, the first base station receives first radio frequency information of a handover area and receives second radio frequency information that is reported by a user equipment served by a cell of the first base station; then detects whether the second radio frequency information reported by the user equipment matches the first radio frequency information of the handover area; and if the second radio frequency information matches the first radio frequency information, sends a measurement instruction message to the user equipment that reports the second radio frequency information, so as to instruct the user equipment to measure signal strength and/or signal quality of a cell at a frequency of a cell of the second base station or only of the cell of the second base station. In this way, small-scale search and measurement can be purposefully performed, thereby improving the search efficiency and achieving a power saving effect.

Figure 13:
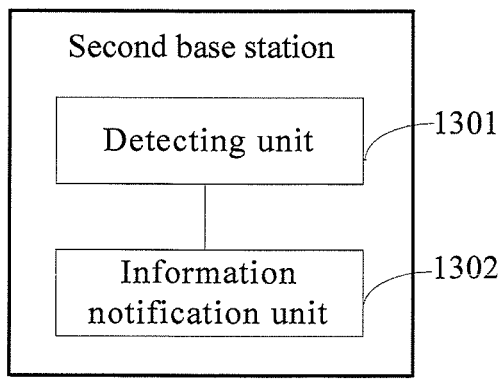
FIG. 13 is a structural block diagram of another second base station according to Embodiment 5.

This embodiment of the present invention further provides a second base station. As shown in FIG. 13, the second base station includes a detecting unit 1301 and an information notification unit 1302.

The detecting unit 1301 is configured to detect proximity of a user equipment.

The detecting unit may detect that transmit power of an uplink signal of the user equipment exceeds a preset power threshold, and then, it may conclude that the user equipment approaches the second base station.

A receiver is arranged on an apparatus of the second base station; therefore, an uplink receiving function is supported, and an uplink message sent by the user equipment is detected, so as to detect that the user equipment approaches the second base station.

The information notification unit 1302 is configured to notify a first base station of proximity information, so that the first base station instructs the user equipment to measure signal strength and/or signal quality of a cell at a frequency of a cell of the second base station or only of the cell of the second base station.

The proximity information also includes a user identifier or resource information of the user equipment in a frequency domain, and/or a time domain, and/or a code domain, and/or a space domain.

When detecting the proximity of the user equipment, the second base station may notify the first base station of the information in a form of the proximity information, where the proximity information includes some information about the user equipment that approaches the second base station and frequency information of the cell of the second base station and/or an identifier of the cell of the second base station; and the first base station instructs, according to the proximity information, the user equipment that approaches the second base station to measure the signal strength and/or signal quality at the frequency of the second base station or measure the signal strength and/or signal quality only for the second base station.

Figure 14:
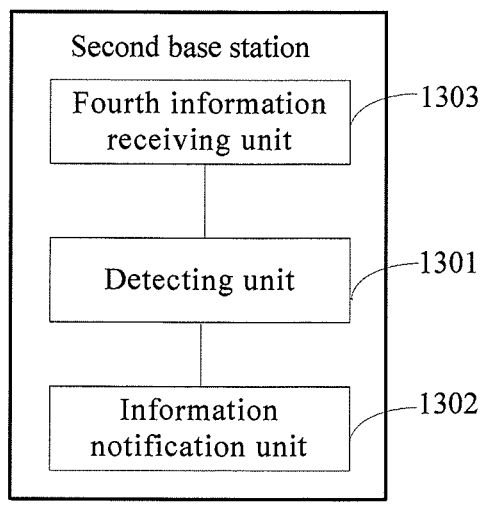
FIG. 14 is a structural block diagram of another second base station according to Embodiment 5.

Further, as shown in FIG. 14, the second base station further includes a fourth information receiving unit 1303, configured to, when the second base station detects the proximity of the user equipment, receive uplink resource information of the user equipment served by the cell of the first base station, where the uplink resource information is sent by the first base station; and detect the corresponding user equipment according to the uplink resource information.

Figure 15:
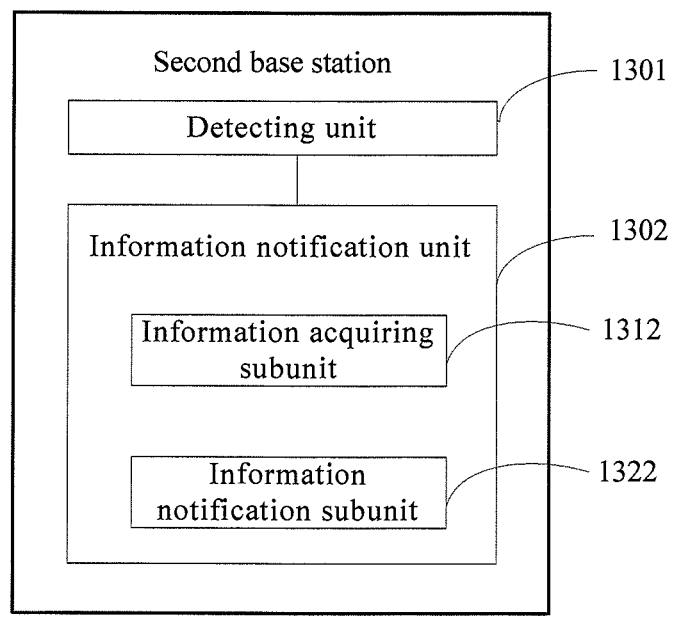
FIG. 15 is a structural block diagram of another second base station according to Embodiment 5.

Further, as shown in FIG. 15, the information notification unit further includes:

an information acquiring subunit 1312, configured to acquire the resource information used by the user equipment, where the second base station detects that transmit power of an uplink signal of the user equipment exceeds a preset power threshold, and the resource information includes at least one of the following: a physical resource block (PRB) index, time domain information, a code sequence index, and a space resource block index; and an information notification subunit 1322, configured to notify the first base station of the resource information, so that the first base station identifies the user equipment according to the resource information and instructs the user equipment to measure the signal strength and/or signal quality of the cell at the frequency of the cell of the second base station or only of the cell of the second base station.

A target base station whose signal strength and/or signal quality exceeds a preset threshold may be obtained by measuring the signal strength and/or signal quality. The user equipment that measures the signal strength and/or signal quality may report a result of the measurement to the first base station in a form of a measurement report. If the result of the measurement satisfies a handover condition, the first base station may send a handover request to a target cell according to the measurement report; the target base station determines, according to a resource condition of a cell of the target base station, to admit the user equipment, and sends a handover response to the first base station; the first base station sends a handover command to the user equipment; and the user equipment hands over to the cell of the target base station.

The second base station provided in this embodiment of the present invention may be used to implement the corresponding method in the embodiment shown in FIG. 3.

According to a second base station provided in this embodiment of the present invention, proximity of a user equipment is detected and a first base station is notified of proximity information, so that the first base station instructs the user equipment to measure signal strength and/or signal quality of a cell at a frequency of a cell of the second base station or only of the cell of the second base station. In this way, small-scale search and measurement can be purposefully performed, thereby improving the search efficiency and achieving a power saving effect.

Figure 16:
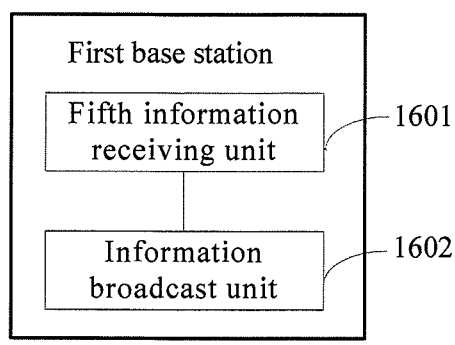
FIG. 16 is a structural block diagram of another first base station according to Embodiment 5.

This embodiment of the present invention further provides a first base station. As shown in FIG. 16, the first base station includes a fifth information receiving unit 1601 and an information broadcast unit 1602.

The fifth information receiving unit 1601 is configured to receive first radio frequency information of a handover area.

Specifically, the first information receiving unit 1601 is configured to receive the first radio frequency information of the handover area, where the first radio frequency information is sent by a second base station, and the first radio frequency information of the handover area is reported by a user equipment served by a cell of the second base station to the second base station.

Alternatively, the first information receiving unit 1601 may also be configured to receive the first radio frequency information of the handover area, where the first radio frequency information is sent by the user equipment that just hands over from the cell of the second base station to a cell of the first base station.

The handover area is an area covering locations of all user equipments that hand over from the cell of the second base station to the cell of the first base station.

The first radio frequency information is radio frequency information of the handover area. The first radio frequency information is obtained, by means of measurement, by the user equipment that is located in the handover area. The first radio frequency information may map to geographical information of the handover area.

The information broadcast unit 1602 is configured to broadcast, in a system message, the first radio frequency information of the handover area, so that when second radio frequency information acquired by the user equipment matches the first radio frequency information of the handover area, the user equipment measures signal strength and/or signal quality of a cell at a frequency of the cell of the second base station or only of the cell of the second base station.

After receiving the first radio frequency information of the handover area, the first base station broadcasts, in the system message, the first radio frequency information, so that all user equipments served by the cell of the first base station may receive the first radio frequency information. The user equipment may periodically measure the second radio frequency information in an area where the user equipment is located, and therefore, the second radio frequency information may map to geographical information of a location of the user equipment. If the user equipment detects that the second radio frequency information matches the first radio frequency information of the handover area, it may be determined that the user equipment already approaches the handover area; in this case, the user equipment may be activated to measure the signal strength and/or signal quality at the frequency of the second base station or measure the signal strength and/or signal quality only for the second base station.

Figure 17:
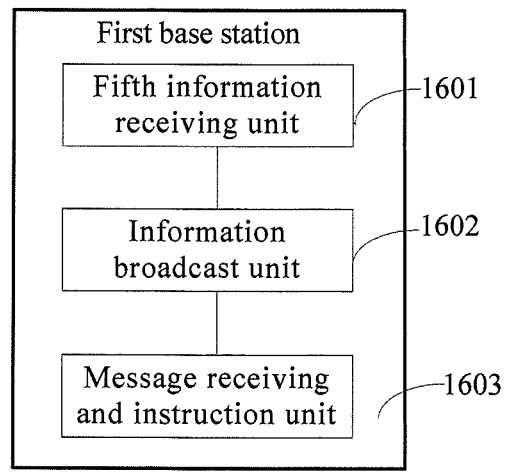
FIG. 17 is a structural block diagram of another first base station according to Embodiment 5.

Further, as shown in FIG. 17, the first base station further includes a message receiving and instruction unit 1603, configured to receive, when the second radio frequency information acquired by the user equipment matches the first radio frequency information of the handover area, a user notification message returned by the user equipment; and instruct, according to the user notification message, the user equipment to measure the signal strength and/or signal quality of the cell at the frequency of the cell of the second base station or only of the cell of the second base station.

The second base station provided in this embodiment of the present invention may be used to implement the corresponding method in the embodiment shown in FIG. 4.

Figure 18:
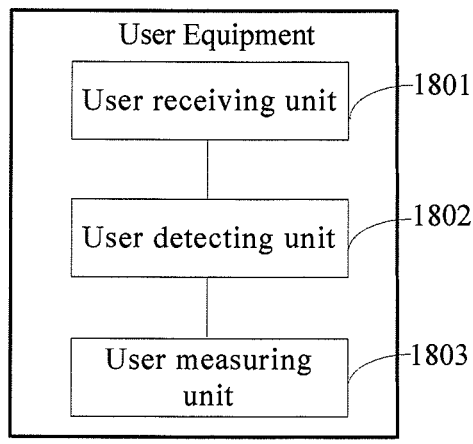
FIG. 18 is a structural block diagram of a user equipment according to Embodiment 5.

This embodiment of the present invention further provides a user equipment. As shown in FIG. 18, the user equipment includes a user receiving unit 1801, a user detecting unit 1802, and a user measuring unit 1803.

The user receiving unit 1801 is configured to receive first radio frequency information of a handover area, where the first radio frequency information is broadcast by a first base station.

The handover area is an area covering locations of all user equipments that hand over from a cell of a second base station to a cell of the first base station.

The first radio frequency information is radio frequency information of the handover area. The first radio frequency information is obtained, by means of measurement, by the user equipment that is located in the handover area. It may be learned from the manner for obtaining the first radio frequency information that the first radio frequency information may map to geographical information of the handover area.

After receiving the first radio frequency information of the handover area, the first base station broadcasts, in a system message, the first radio frequency information, so that all user equipments served by the cell of the first base station may receive the first radio frequency information.

The user detecting unit 1802 is configured to detect whether the first radio frequency information of the handover area matches second radio frequency information acquired by the user equipment.

The user equipment may periodically measure the second radio frequency information in an area where the user equipment is located, and therefore, the second radio frequency information may map to geographical information of a location of the user equipment. The user equipment automatically detects whether the second radio frequency information matches the first radio frequency information of the handover area, so as to determine whether the user equipment already approaches the handover area.

The user measuring unit 1803 is configured to, when the user detecting unit detects that the second radio frequency information matches the first radio frequency information, measure signal strength and/or signal quality of a cell at a frequency of the cell of the second base station or only of the cell of the second base station.

When the user equipment is in idle state, if the user equipment detects that the second radio frequency information matches the first radio frequency information of the handover area, it may be determined that the user equipment already approaches the handover area; in this case, the user equipment may be activated to measure the signal strength and/or signal quality at the frequency of the second base station or measure the signal strength and/or signal quality only for the second base station.

Figure 19:
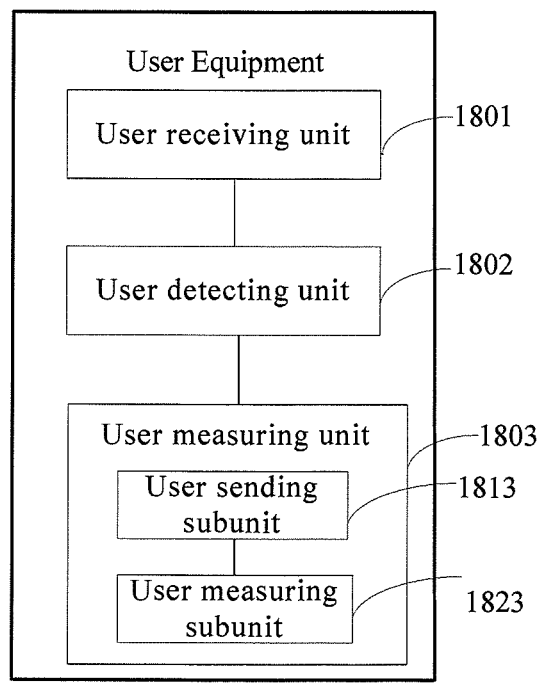
FIG. 19 is a structural block diagram of another first base station according to Embodiment 5.

When the user equipment is in connected state, as shown in FIG. 19, the user measuring unit 1803 further includes a user sending subunit 1813 and a user measuring subunit 1823.

The user sending subunit 1813 is configured to, when the user detecting unit detects that they match, send a user notification message to the first base station, so that the first base station instructs, according to the user notification message, the user equipment to measure the signal quality.

The user measuring subunit 1823 is configured to measure the signal quality according to an instruction from the first base station.

A target base station whose signal strength and/or signal quality exceeds a preset threshold may be obtained by measuring the signal strength and/or signal quality. The user equipment that measures the signal strength and/or signal quality may report a result of the measurement to the first base station in a form of a measurement report. If the result of the measurement satisfies a handover condition, the first base station may send a handover request to a target cell according to the measurement report; the target base station determines, according to a resource condition of a cell of the target base station, to admit the user equipment, and sends a handover response to the first base station; the first base station sends a handover command to the user equipment; and the user equipment hands over to the cell of the target base station.

The user equipment provided in this embodiment of the present invention may be used to implement the corresponding method in the embodiment shown in FIG. 5.

According to a first base station and the user equipment that are provided in this embodiment of the present invention, a first base station receives first radio frequency information of a handover area that is located between the first base station and a second base station; and broadcasts, in a system message, the first radio frequency information of the handover area, so that when second radio frequency acquired by a user equipment matches the first radio frequency information of the handover area, the user equipment measures signal strength and/or signal quality of a cell at a frequency of a cell of the second base station or only of the cell of the second base station. In this way, small-scale search and measurement can be purposefully performed, thereby improving the search efficiency and achieving a power saving effect.

Figure 20:
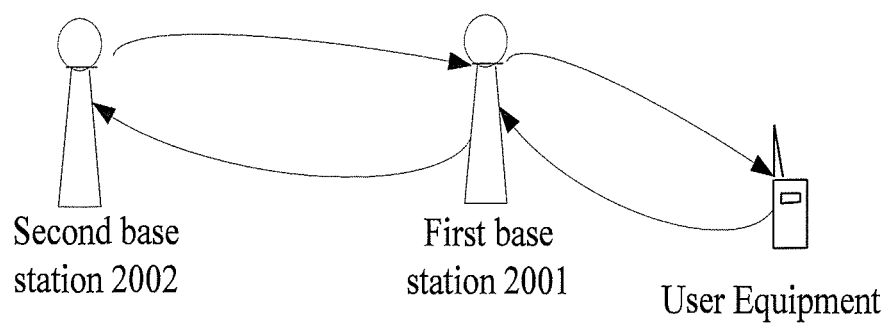
FIG. 20 is a schematic diagram of a cell discovery system according to Embodiment 5.

This embodiment of the present invention further provides a cell discovery system. As shown in FIG. 20, the cell discovery system includes a first base station 2001 corresponding to the embodiment shown in FIG. 11 and a second base station 2002 corresponding to the embodiment shown in FIG. 12.

The second base station 2002 is configured to receive first radio frequency information of a handover area, where the first radio frequency information is reported by a user equipment in a cell of the second base station; and send the first radio frequency information of the handover area to the first base station 2001. Another alternative manner may be as follows: The first base station 2001 directly receives the first radio frequency information of the handover area, where the first radio frequency information is sent by the user equipment that just hands over from the cell of the second base station to a cell of the first base station.

In addition to receiving the first radio frequency information sent by the second base station 2002, the first base station 2001 further receives second radio frequency information reported by the user equipment served by the cell of the first base station; and when detecting that the second radio frequency information reported by the user equipment matches the first radio frequency information of the handover area, sends a measurement instruction message to the user equipment that reports the second radio frequency information, so as to instruct the user equipment to measure signal strength and/or signal quality of a cell at a frequency of the cell of the second base station or only of the cell of the second base station.

When it is detected whether the second radio frequency information reported by the user equipment matches the first radio frequency information of the handover area, there may be two implementation scenarios. One scenario is detecting whether the second radio frequency information reported by the user equipment falls within a radio frequency range value in the first radio frequency information of the handover area; the other scenario is detecting whether a difference between the second radio frequency information reported by the user equipment and the first radio frequency information of the handover area is less than a preset radio frequency threshold.

The first radio frequency information of the handover area includes reference signal received power, RSRP, and/or reference signal received quality, RSRQ, and/or an angle of arrival, AOA.

Figure 21:
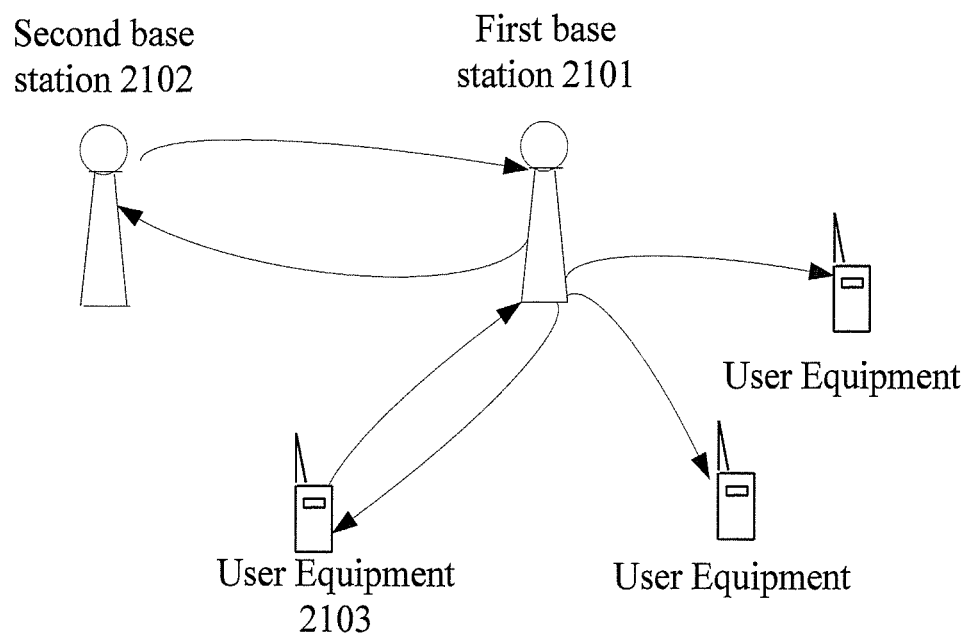
FIG. 21 is a schematic diagram of another cell discovery system according to Embodiment 5.

In another aspect, this embodiment of the present invention further provides a cell discovery system. Specifically, as shown in FIG. 21, the cell discovery system includes a first base station 2101, a second base station 2102, and a user equipment 2103. The first base station 2101 may be the first base station corresponding to the embodiment shown in FIG. 17, and the user equipment 2103 may be the user equipment corresponding to the embodiment shown in FIG. 19.

The second base station 2102 receives first radio frequency information of a handover area that is located between the first base station 2101 and the second base station 2102, where the first radio frequency information is reported by a user equipment served by a cell of the second base station; and sends the radio frequency information to the first base station 2101. Another alternative manner may be as follows: The first base station 2101 directly receives the first radio frequency information of the handover area, where the first radio frequency information is sent by the user equipment that just hands over from the cell of the second base station to a cell of the first base station.

After receiving the first radio frequency information of the handover area, the first base station 2101 broadcasts, in a system message, the first radio frequency information, so that all user equipments served by the first base station 2101 may receive the message. After the receiving the first radio frequency information of the handover area, the user equipment 2103 detects whether the received first radio frequency information of the handover area matches second radio frequency information acquired by the user equipment; if the second radio frequency information matches the first radio frequency information, when the user equipment 2103 is in connected state, the user equipment 2103 sends a user notification message to the first base station 2101, so that the first base station 2101 instructs, according to the user notification message, the user equipment 2103 to measure the signal strength and/or signal quality of a cell at a frequency of the cell of the second base station or only of the cell of the second base station. When the user equipment 2103 is in idle state, the user equipment 2103 may directly measure the signal strength and/or signal quality of the cell at the frequency of the cell of the second base station or only of the cell of the second base station. This embodiment of the present invention does not set a limitation to this.

When the user equipment 2103 detects a matching condition, there may be two implementation scenarios. One scenario is detecting whether the second radio frequency information falls within a radio frequency range value in the first radio frequency information; the other scenario is detecting whether a difference between the second radio frequency information and the first radio frequency information is less than a preset radio frequency threshold.

According to the system provided in this embodiment of the present invention, the first base station 2001 includes the first information receiving unit, the second information receiving unit, the detecting unit, and the first formation sending unit that are described above; and the second base station 2002 includes the third information receiving unit and the second information sending unit that are described above. In addition, the first base station 2101 includes the fifth information receiving unit and the information broadcast unit that are described above; and the user equipment 2103 includes the user receiving unit, the user detecting unit, and the user measuring unit that are described above, where the user measuring unit further includes the user sending subunit and the user measuring subunit.

In a practical application, in Embodiment 5 of the present invention, the first base station may be a macro base station, and the second base station may be a low-power base station or a macro base station. The low-power base station includes but is not limited to a pico base station, an RRH (remote radio head), an RRU (radio remote unit), a Relay (relay), an NB (NodeB, base station node), a BS (base station), a femto (home base station), an LTE HIFI (high-speed network), WIFI (wireless broadband), a user equipment in D2D, or the like.

According to a cell discovery system further provided in this embodiment of the present invention, a first base station receives first radio frequency information of a handover area and receives second radio frequency information that is reported by a user equipment served by a cell of a first base station; then detects whether the second radio frequency information reported by the user equipment matches the first radio frequency information of the handover area; and if they match, sends a measurement instruction message to the user equipment that reports the second radio frequency information, so as to instruct the user equipment to measure signal strength and/or signal quality of a cell at a frequency of a cell of a second base station or only of the cell of the second base station. In this way, small-scale searching and measurement can be purposefully performed, thereby improving searching efficiency and achieving a power saving effect. In addition, according to the another cell discovery system provided in this embodiment of the present invention, a first base station receives first radio frequency information of a handover area that is located between the first base station and a second base station; and broadcasts, in a system message, the first radio frequency information of the handover area, so that when second radio frequency acquired by a user equipment matches the first radio frequency information of the handover area, the user equipment measures signal strength and/or signal quality of a cell at a frequency of a cell of the second base station or only of the cell of the second base station. In this way, small-scale search and measurement can be purposefully performed, thereby improving the search efficiency and achieving a power saving effect.

A person of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage mediums include various mediums capable of storing program code, such as a ROM, a RAM, a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A first base station, comprising:
   a memory; and
   a processor in communication with the memory, the processor configured to:
   receive first radio frequency information of a handover area;
   receive second radio frequency information that is reported by a user equipment served by a cell of the first base station;
   detect whether the second radio frequency information reported by the user equipment matches the first radio frequency information of the handover area; and
   send, when the processor detects that the second radio frequency information reported by the user equipment matches the first radio frequency information of the handover area, a measurement instruction message to the user equipment that reports the second radio frequency information for instructing the user equipment to measure signal strength and/or signal quality of a cell at a frequency of a cell of a second base station or only of the cell of the second base station.

2. The first base station according to claim 1, wherein the processor is further configured to detect whether the second radio frequency information reported by the user equipment falls within a radio frequency range value in the first radio frequency information of the handover area.

3. The first base station according to claim 1, wherein the processor is further configured to detect whether a difference between the second radio frequency information reported by the user equipment and the first radio frequency information of the handover area is less than a preset radio frequency threshold.

4. The first base station according to claim 1, wherein the first radio frequency information of the handover area and the second radio frequency information reported by the user equipment comprise at least one of the following items: reference signal received power (RSRP), reference signal received quality (RSRQ), and an angle of arrival (AOA).

5. The first base station according to claim 1, wherein the processor is further configured to receive the first radio frequency information of the handover area, the first radio frequency information is sent by the second base station, and the first radio frequency information of the handover area is reported by the user equipment served by the cell of the second base station to the second base station.

6. The first base station according to claim 1, wherein the processor is further configured to receive the first radio frequency information of the handover area, and the first radio frequency information is sent by the user equipment that hands over from the cell of the second base station to the cell of the first base station and that is still located in the handover area.

* * * * *